United States Patent [19]

Gutz

[11] 4,373,148
[45] Feb. 8, 1983

[54] ROTATING ELECTRIC MACHINE HAVING A TOROIDAL WOUND MOTOR WINDING

[75] Inventor: Kenneth H. Gutz, Clearwater, Fla.

[73] Assignee: The United States of America as represented by the Secretary of the Navy, Washington, D.C.

[21] Appl. No.: 235,287

[22] Filed: Feb. 17, 1981

[51] Int. Cl.³ .............................................. H02P 7/06
[52] U.S. Cl. ................................... 318/254; 318/138; 310/164
[58] Field of Search .................... 318/254, 254 A, 138; 310/168, 169, 170, 68 R, 155, 164

[56] References Cited

U.S. PATENT DOCUMENTS

| | | | |
|---|---|---|---|
| 3,586,942 | 6/1971 | McMahan | 318/254 |
| 3,803,433 | 4/1974 | Ingenito | 318/138 X |
| 3,942,084 | 3/1976 | Louth | 318/254 X |
| 3,961,214 | 6/1976 | Lokkart | 310/168 X |
| 4,011,487 | 3/1977 | Loomis | 318/254 X |
| 4,150,314 | 4/1979 | Zabler et al. | 310/168 X |
| 4,282,471 | 8/1981 | Budniak et al. | 318/254 X |
| 4,283,664 | 8/1981 | Ebert | 318/254 A X |
| 4,286,184 | 8/1981 | Kögler et al. | 318/254 X |
| 4,317,072 | 2/1982 | Goof et al. | 318/254 X |

Primary Examiner—J. V. Truhe
Assistant Examiner—Richard M. Moose
Attorney, Agent, or Firm—Robert F. Beers; Robert W. Adams; David S. Kalmbaugh

[57] ABSTRACT

A rotor rotating electric machine having a toroidal winding assembly wound in a toroidal helix configuration. The toroidal winding includes four coils, each of which is wound in the form of a toroidal helix around a thin cylindrical ring. A rotor, coaxially rotatable within the toroidal winding, includes a magnetic assembly which has alternately a plurality of north pole permanent magnets and a plurality of south pole permanent magnets. Excitation of the toroidal winding assembly will, in turn, cause the rotor to rotate in a predetermined direction.

10 Claims, 10 Drawing Figures

ROTATING ELECTRIC MACHINE HAVING A TOROIDAL WOUND MOTOR WINDING

BACKGROUND OF THE INVENTION

1. Field of the Invention

This invention relates generally to rotating electric machinery. In particular, this invention relates to a two phase brushless torque motor winding which is wound in a toroidal helix configuration.

2. Description of the Prior Art

The design configuration utilized by conventional motors of the prior art, that of a permanent magnet stator and a wound iron rotor, have some undesirable performance characteristics and are relatively expensive to manufacture. In addition, the miniature motors now available are generally intended for use in toys where a relatively inexpensive product is desired, or the miniature motors are of a very high quality for use in time pieces and measurement systems where a very high degree of accuracy is required. However, motors of the last mentioned type are more complicated and considerably more expensive than the aforementioned toy motors.

The closest known prior art to the subject invention is an electric motor described in U.S. Pat. No. 3,191,081 to Fritz Faulhabler. A permanent magnet miniature motor is disclosed therein comprising a stationary magnet coaxially located within a yoke, and a rotor having a hollow cylindrical armature located within the stationary magnet. The armature has a winding of sequential cylindrically and helically wound wire turns around, and restricted to the periphery of the armature. Each winding turn of the armature, in turn, extends in skewed relationship to the rotor axis from one axial side of the armature to the other along a portion of the peripheral spacing between each two sequential north-south field poles of the magnet. In addition, the aforementioned motor includes a commutator which has mutually insulated sequential segments individually electrically connected to a plurality of taps distributed on the periphery of the winding.

While the last mentioned device of the prior art performs satisfactorily for its intended purpose, that of providing a relatively inexpensive miniature motor which may be utilized in measurement systems and the like, the last mentioned device is complex in design, does not operate in exactly the same manner as the subject invention, and contains a combination of elements that is somewhat different from that of the present invention.

SUMMARY OF THE INVENTION

The subject invention overcomes some of the disadvantages of the prior art in that it comprises a relatively simple torque motor which utilizes a toroidal winding. Consequently, the subject invention is more efficient, has improved performance characteristics, and is less costly than conventionally wound electric motors.

Included in the subject invention is a stator having a toroidal winding assembly coaxially mounted within the stator, and a rotor coaxially rotatable within the aforementioned stator. The rotor, in turn, includes a magnetic assembly which has alternatively eight north pole permanent magnets and eight south pole permanent magnets, while the toroidal winding assembly includes first, second, third and fourth coils, each of which is wound in the form of a toroidal helix around a thin cylindrical ring. Mounted on the stator are a pair of hall effect sensors which detect the magnetic flux of the aforementioned north and south pole permanent magnets and which, when uniquely combined with amplifiers, multipliers, and a voltage source excite the coils of the toroidal winding assembly so as to cause the rotation of the rotor.

DESCRIPTION OF THE PREFERRED EMBODIMENT

Figure 1:
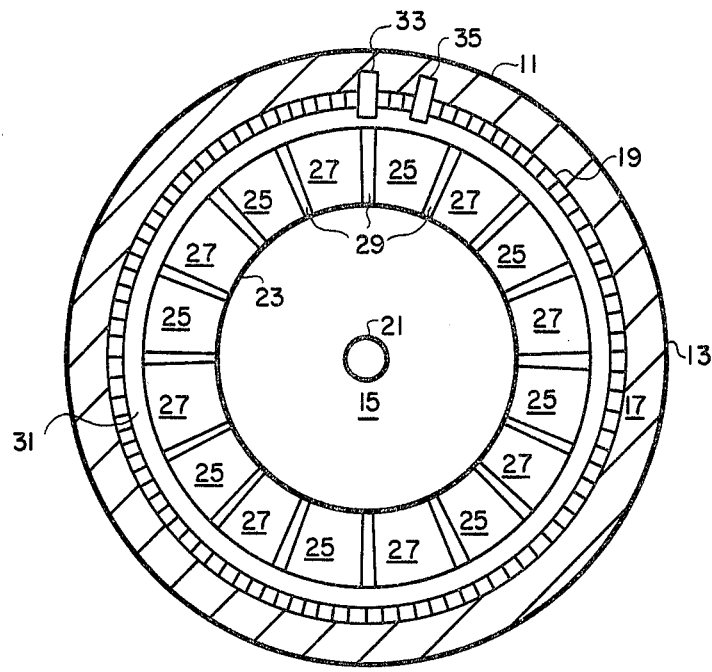
FIG. 1 is a schematic, end view of a two phase brushless torque motor constituting the subject invention.

The preferred embodiment of the subject invention will now be discussed in some detail in conjunction with all of the figures of the drawing, wherein like parts are designated by like reference numerals insofar as it is possible and practical to do so.

Referring first to FIG. 1, there is shown a two phase brushless torque motor 11 comprising a stator 13, and a rotor 15 coaxially rotatable within stator 13. Stator 13, in turn, includes an outer metallic housing 17 and a toroidal winding assembly 19 which is coaxially mounted within housing 17, and which when excited causes rotor 15 to rotate in a counterclockwise direction within stator 13, as will be discussed more fully below. Rotor 15 has positioned at the center thereof a shaft 21, each end of which passes through an aperture, not shown, located within housing 17 so as to allow for the rotation of rotor 15 within housing 17. Located between each aperture of housing 17 and the end of shaft 21 and passing therethrough is a bearing, not shown, which allows for the rotation of rotor 15.

Rotor 15 has located at the periphery thereof a magnetic assembly 23 which includes alternately eight south pole permanent magnets 25 and eight north pole permanent magnets 27. Located between each south pole 25 and the north pole 27 adjacent thereto is a nonmagnetic gap 29. In addition, there is located between the periphery of rotor 15 and toroidal winding assembly 19 of stator 13 a cylindrical air gap 31.

Figure 3:
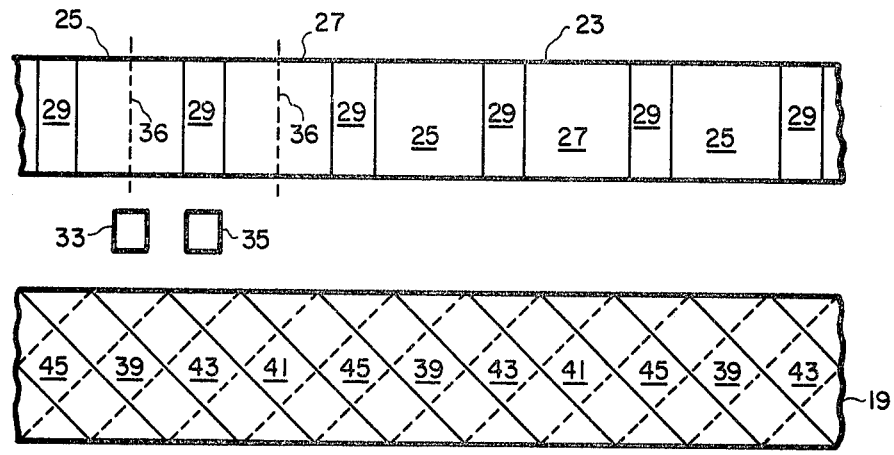
FIG. 3 is a schematic illustration of a portion of the rotor and the toroidal winding assembly of the invention of FIG. 1.

Mounted upon housing 17 of stator 13 are a pair of hall effect sensors 33 and 35 which are positioned such that when hall effect sensor 33 is positioned adjacent to one of the nonmagnetic gaps 29, hall effect sensor 35 will be positioned adjacent to the center line 36, FIG. 3, of the south pole 25 or north pole 27 of magnetic assembly 23 located adjacent the aforementioned nonmagnetic gap 29.

At this time it may be noteworthy to mention that there are commercially available a variety of hall effect sensors which may be utilized by the subject invention to detect the flux density of the magnetic field produced by magnetic assembly 23. For example, one such hall effect device which may be utilized as sensors 33 and 35 of the subject invention is a Model Number 9SS magnetically operated solid state hall effect sensor manufactured by Micro Switch of Freeport, Ill.

Referring now to FIGS. 2A through 2E, there is shown toroidal winding assembly 19 which includes a thin cylindrical shaped ring 37 and four coils 39, 41, 43, and 45, each of which is wound in a toroidal helix configuration around cylindrical shaped ring 37, and each of which has, when completely wound around ring 37, one hundred and four turns.

With reference to FIGS. 2A through 2E, and 3, and for the sake of clarity in describing toroidal winding assembly 19, it should be noted that a solid line indicates that a winding is located on the outer surface of cylindrical shaped ring 37 while a dashed line indicates that a winding is located on the inner surface of cylindrical shaped ring 37. Thus, for example, the solid line of coil 39 is adjacent housing 17, FIG. 1, of stator 13, FIG. 1, while the dashed line of coil 39 is adjacent air gap 31, FIG. 1.

Figure 4:
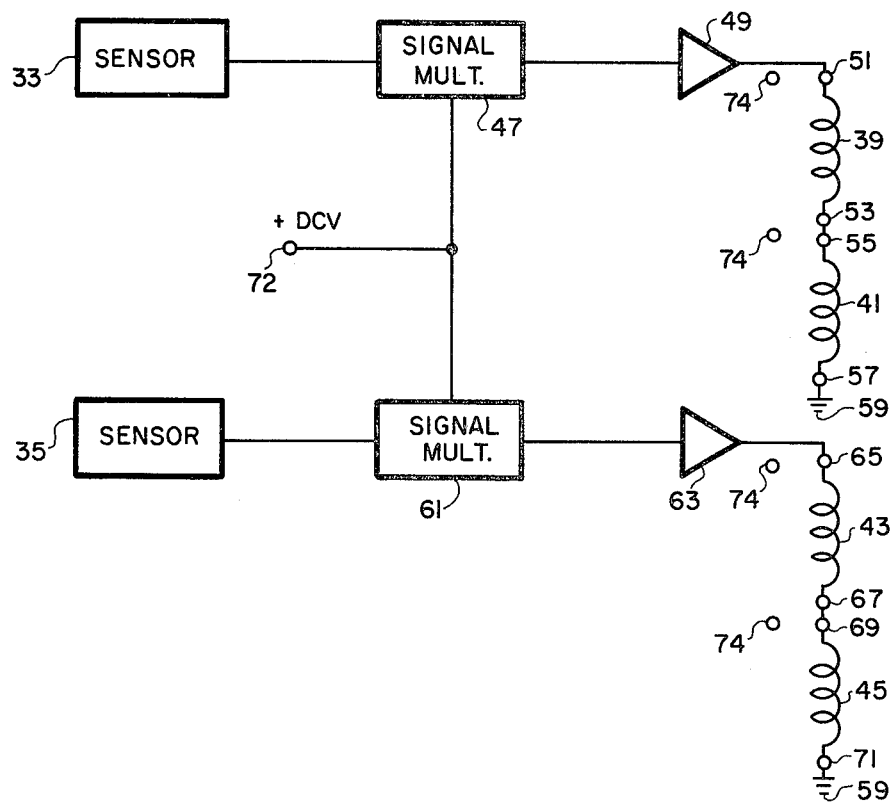
FIG. 4 is an electrical diagram of the circuit utilized to excite the rotor of the torque motor of FIG. 1.
Figure 5:
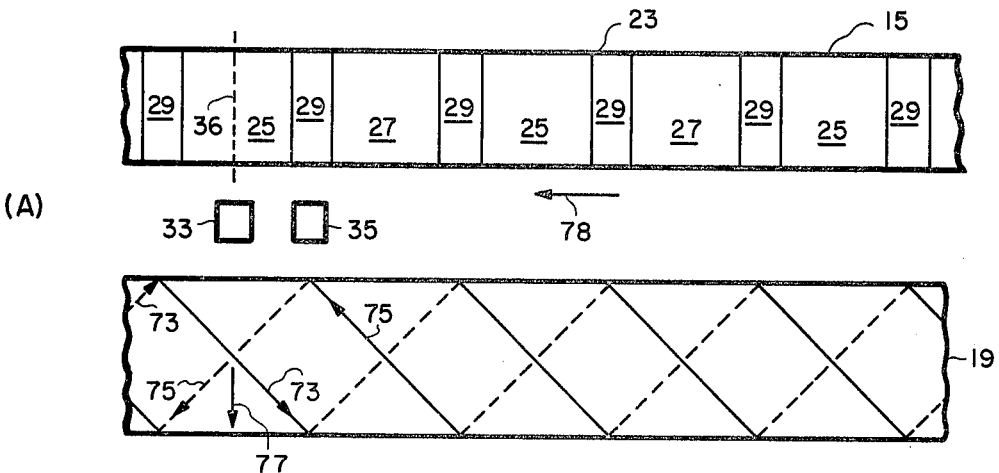
FIGS. 5A and 5B illustrate the direction of current flow within the toroidal winding assembly of FIG. 1 when the rotor of the torque motor of FIG. 1 is rotating.
Figure 5:
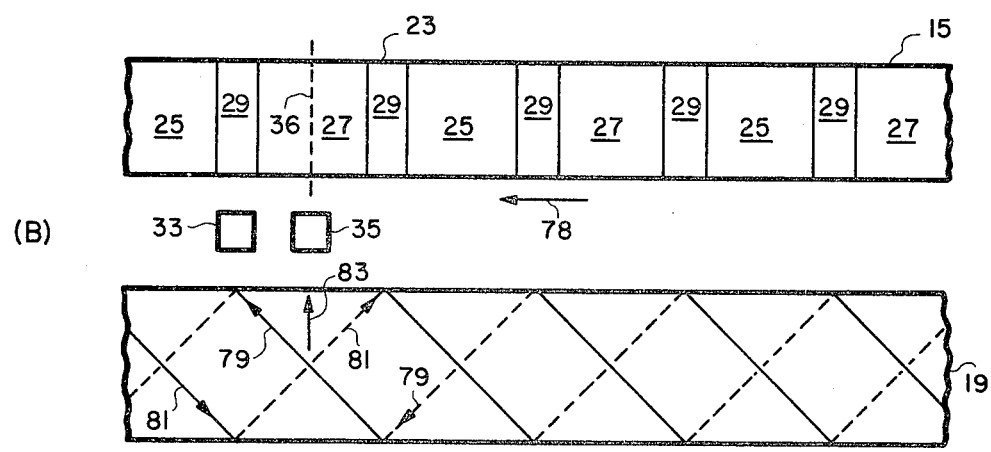

With reference to FIGS. 3, 5A, and 5B, it should be noted that solely for the purpose of illustration magnetic assembly 23 is depicted as being adjacent winding assembly 19. As discussed above, the preferred embodiment of the subject invention is fully illustrated in FIGS. 1, 2A through 2E, and 4.

Referring again to FIGS. 2A through 2E, when moving in a direction from left to right, or in a clockwise direction around cylindrical shaped ring 37, coils 39 through 45 are positioned upon cylindrical shaped ring 37 such that coil 43 is located adjacent coil 39, coil 41 is located adjacent coil 43, and coil 45 is located adjacent coil 41. Referring to FIG. 3, it should be noted that each conductor for any coil 39, 41, 43, or 45 spans one pole pitch, equivalent to the spacing between the center lines, indicated by dashed lines 36, of adjacent south, north poles 25 and 27.

Referring now to FIG. 4, there is shown sensor 33, the output of which is connected to the first input of a signal multiplier 47, with the output thereof connected to the input of an amplifier 49. The output of amplifier 49 is connected to terminal 51 of coil 39, terminal 53 of which is connected to terminal 55 of coil 41. Terminal 57 of coil 41 is, in turn, connected to a ground 59.

The output of sensor 35 is connected to the first input of a signal multiplier 61, the output of which is connected to the input of an amplifier 63, with the output thereof connected to terminal 65 of coil 43. Terminal 67 of coil 43 is, in turn, connected to terminal 69 of coil 45, terminal 71 of which is connected to ground 59. The output of a positive direct current voltage source 72 is connected to the second input of signal multiplier 47, and the second input of signal multiplier 61. In addition, with reference to FIG. 4, there is shown a quartet of dots 74, the first of which is placed adjacent terminal 51 of coil 39, the second of which is placed adjacent terminal 55 of coil 41, the third of which is placed adjacent terminal 65 of coil 43, and the fourth of which is placed adjacent terminal 69 of coil 45. Each of the aforementioned dots 74, in turn, indicate the terminals of windings 39, 41, 43, and 45 whose voltage potentials due to electromagnetic induction rise and fall together.

It may be noted at this time that there are commercially available a variety of multiplier-divider integrated circuits which may be utilized as signal multipliers 47 and 61 of the subject invention such as, for example, a Model Number 4214 multiplier-divider manufactured by Burr Brown, Inc., of Tucson, Ariz.

The operation of the subject invention will now be discussed in conjunction with all the figures of the drawings.

Figure 2:
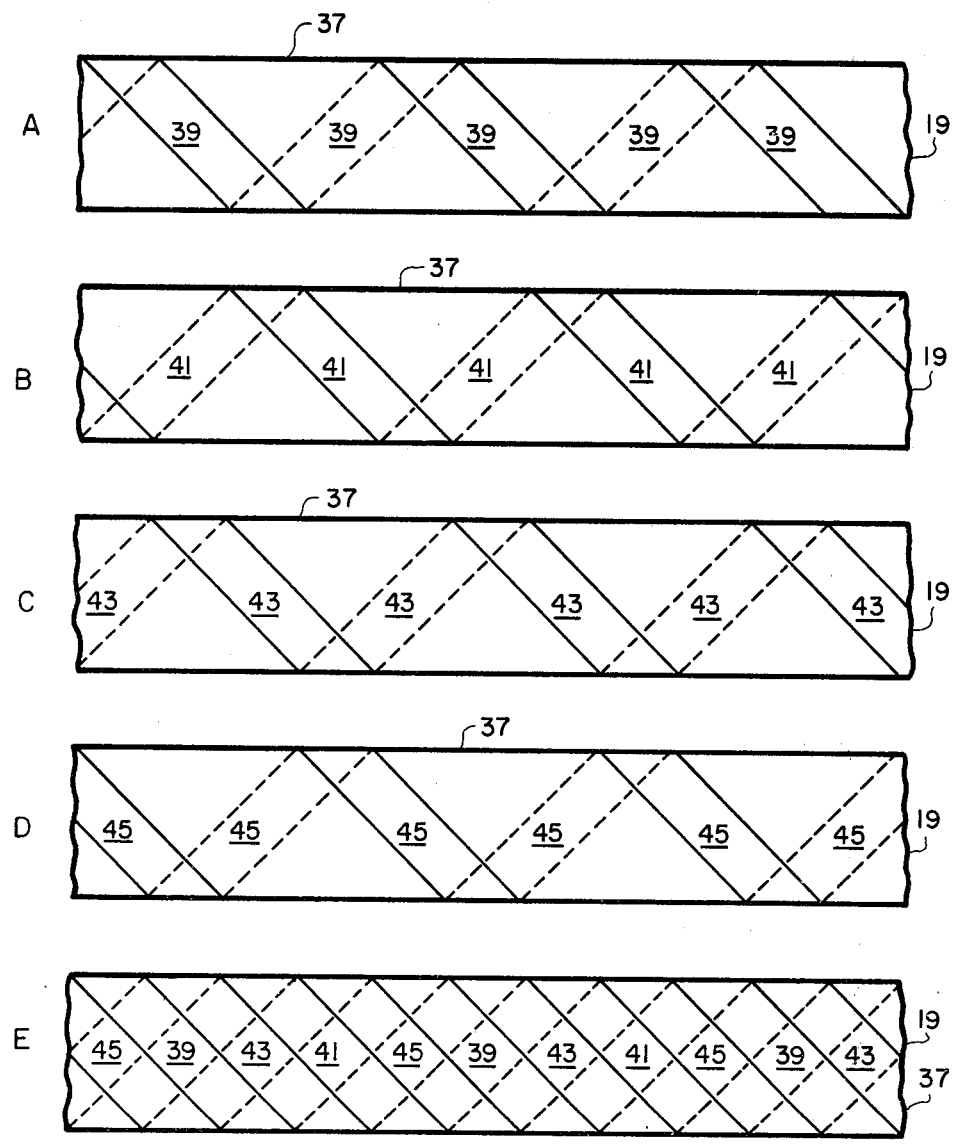
FIGS. 2A, 2B, 2C, 2D, and 2E are schematic diagrams of the coils of the toroidal winding assembly of the invention of FIG. 1.

Referring first to FIGS. 2E, 4 and 5A, sensors 33 and 35 each will sense the magnetic flux density of the magnetic field generated by the north and south poles of magnetic assembly 23, and will produce an analog signal proportional to the flux density of the magnetic field sensed thereby.

It should be noted at this time that the magnetic flux lines of the magnetic field generated by magnetic assembly 23 flow from north poles 27 to south poles 25.

Thus, sensor 33, which in FIG. 5A is depicted as being positioned at center line 36 of south pole 25, will sense the maximum flux density of the magnetic field generated by south pole 25 of magnetic assembly 23 and produce, in response to the sensing of the aforementioned magnetic field thereby, an analog signal at the output thereof. Sensor 35, which is depicted in FIG. 5A as being positioned within non-magnetic gap 29, will sense no magnetic field, and thus will not produce an analog signal at the output thereof.

The analog signal produced by sensor 33 is supplied to the input of signal multiplier 47, which multiplies the aforementioned analog signal by a direct current voltage signal provided by direct current voltage source 72 so as to provide at the output thereof a winding excitation voltage signal.

The winding excitation voltage signal provided by signal multiplier 47 is then amplified by amplifier 49. The amplified excitation voltage signal is then supplied to coils 39 and 41 such that the current flow through coil 39 is in the direction indicated by line 73, and the current flow through coil 41 is in the direction indicated by line 75. This, in turn, results in an axial component of current flow having the direction indicated by arrow 77.

With reference to FIGS. 5A and 5B, it should be noted that a solid line indicates that current flow through a coil is on the outer surface of toroidal winding assembly 19, while a dashed line indicates that current flow through a coil is on the inner surface of toroidal winding assembly 19.

Current flow 73 through winding assembly 19 and the magnetic flux generated by magnetic assembly 23 will produce a force upon rotor 15 in accordance with the relationship $$\bar{F} = L \times \bar{I} \times \bar{B} \times N, \qquad (1)$$

where F is the force exerted upon rotor 15, L is the length of the wire in winding assembly 19, I is the axial component of current flow through winding assembly 19, B is the magnetic flux density of the magnetic field generated by magnetic assembly 23, and N is the number of conductors in windings 39 and 41 and/or the number of conductors in windings 43 and 45. In addition, the direction of the force exerted upon the rotor is determined by the vector product of $\bar{I} \times \bar{B}$.

Thus, in accordance with relationship (1) above, a force is exerted upon rotor 15 which moves magnetic assembly 23 of rotor 15 in the direction indicated by arrow 78.

Referring now to FIGS. 2E, 4, and 5B, sensor 33 which is depicted in FIG. 5B as having moved to within nonmagnetic gap 29, will sense no magnetic field and thus will not produce an analog signal at the output thereof. Sensor 35, which in FIG. 5B has moved to the center line 36 of north pole 27, will sense the maximum flux density of the magnetic field generated by north pole 27 of magnetic assembly 23 and produce, in response to the sensing of the aforementioned magnetic field thereby, an analog signal at the output thereof. The analog signal produced by sensor 35 is supplied to the input of signal multiplier 61 which multiplies the aforementioned analog signal by the direct current voltage signal provided by voltage source 72 so as to provide at the output thereof a winding excitation voltage signal. The winding excitation voltage signal provided by signal multiplier 61 is then amplified by amplifier 63.

The amplified excitation voltage signal is then supplied to coils 43 and 45 so as to excite the aforementioned coils 43 and 45 such that the current flow through coil 43 is in the direction indicated by line 79, and the current flow through coil 45 is in the direction indicated by line 81. This, in turn, results in an axial component of current flow having the direction indicated by arrow 83.

Current flow 83 through winding assembly 19, and the magnetic flux generated by magnetic assembly 23 will exert upon rotor 15 a force in accordance with relationship (1) above. The aforementioned force, in turn, will move magnetic assembly 23 of rotor 15 in the direction indicated by arrow 78. Thus, in accordance with relationship (1) above, a force is exerted upon rotor 15 such that rotor 15 will continue to rotate in a counterclockwise direction. As magnetic assembly 23 continues to rotate in a counterclockwise direction, the analog signals produced by sensors 33 and 35 become sinusoidal waveform signals which are displaced ninety electrical degrees. Multiplication of the aforementioned sinusoidal waveform signals in signal multipliers 47 and 61 by the direct current voltage signal provided by direct current voltage source 72 will result in current flow through windings 39 through 45 such that the torque applied to windings 39 through 45, and thus rotor 15, will remain constant. This, in turn, results in the rotational speed of rotor 15 being proportional to the direct current voltage signal provided by direct current voltage source 72.

From the foregoing, it may readily be seen that the subject invention comprises a new, unique, and exceedingly useful toroidal winding for a brushless torque motor which constitutes a considerable improvement over the known prior art. The toroidal winding, when utilized in conjunction with appropriate switching and exciting electronics and a magnetic assembly, has the following features: constant reluctance with rotation, efficient use of winding volume, low cost machine winding, a minimal radial winding dimension, low inductance, and angled conductors for reduced torque ripple.

Obviously, many modifications and variations of the present invention are possible in light of the above teachings. It is, therefore, to be understood that within the scope of the appended claims, the invention may be practiced otherwise than as specifically described.

What is claimed is:

1. A rotating electric machine comprising, in combination:
   a metallic housing having a pair of apertures;
   a toroidal winding assembly coaxially mounted within said housing, said toroidal winding assembly having a cylindrical shaped ring, and first, second, third, and fourth coils, each coil of which is wound in a toroidal helix configuration around said cylindrical shaped ring, and each coil of which has first and second terminals with the second terminal of said first coil connected to the first terminal of said third coil, and the second terminal of said second coil connected to the first terminal of said fourth coil;
   a rotor coaxially rotatable within said toroidal winding assembly and having on the periphery thereof a magnetic assembly, said magnetic assembly having alternately a plurality of north pole magnets and a plurality of south pole magnets generating a magnetic field having a predetermined magnetic flux density, said rotor having a nonmagnetized gap between each alternate north pole and south pole magnet and defining a gap between said rotor and said toroidal winding assembly;
   first detecting means, mounted upon said housing and having an output, for sensing the flux density of the magnetic field generated by said magnetic assembly and for providing a first analog signal proportional to the flux density of the magnetic field sensed thereby;
   second detecting means having an output, mounted upon said housing, and positioned upon said housing such that when said first detecting means is positioned adjacent one of said nonmagnetic gaps, said second detecting means will be positioned at the center of the adjacent north or south pole of said magnetic assembly, said second detecting means for sensing the flux density of the magnetic field generated by said magnetic assembly, and for providing a second analog signal proportional to the flux density of the magnetic field sensed thereby; and
   circuit means having a first terminal connected to the output of said first detecting means, a second terminal connected to the output of said second detecting means, a third terminal connected to the first terminal of said first coil, a fourth terminal connected to the first terminal of said second coil, and a ground terminal connected to the second terminal of said third coil and the second terminal of said fourth coil providing a first winding excitation signal in response to said first analog signal, and a second winding excitation signal in response to said second analog signal, said first winding excitation signal to effect the excitation of the first and third coils of said toroidal winding assembly, and said second winding excitation signal to effect the excitation of the second and fourth coils of said toroidal winding assembly so as to cause the rotation of said rotor in a predetermined direction at a constant speed.

2. The rotating electric machine of claim 1, wherein said plurality of north pole magnets and said plurality of south pole magnets comprise eight north pole permanent magnets and eight south pole permanent magnets.

3. The rotating electric machine of claim 1, wherein said plurality of north pole magnets and said plurality of south pole magnets define sixteen nonmagnetic gaps.

4. The rotating electric machine of claim 1, wherein said first and second detecting means each comprise a hall effect sensor.

5. The rotating electric machine of claim 1, wherein said circuit means comprises:

a first signal multiplier having a first input connected to the output of said first detecting means, a second input, and an output;

a second signal multiplier having a first input connected to the output of said second detecting means, a second input, and an output;

a direct current voltage source having an output connected to the second input of said first signal multiplier and the second input of said second signal multiplier;

a first amplifier having an input connected to the output of said first signal multiplier and an output connected to the first terminal of said first coil;

a second amplifier having an input connected to the output of said second signal multiplier, and an output connected to the first terminal of said second coil; and a ground connected to the second terminal of said third coil and the second terminal of said fourth coil.

6. The rotating electric machine of claim 1, in which said rotor includes at the center thereof a shaft, one end of which passes through the first of the pair of apertures of said metallic housing, and the opposite end of which passes through the second of said pair of apertures of said metallic housing.

7. An electric motor comprising, in combination:

a metallic housing having a pair of apertures;

a toroidal winding assembly coaxially mounted within said housing, said toroidal winding assembly having a cylindrical shaped ring and first, second, third, and fourth coils, each coil of which is wound in a toroidal helix configuration around said cylindrical shaped ring, and each coil of which has first and second terminals with the second terminal of said first coil connected to the first terminal of said third coil, and the second terminal of said second coil connected to the first terminal of said fourth coil;

a ground effectively connected to the second terminal of said third coil and the second terminal of said fourth coil;

a rotor coaxially rotatable within said toroidal winding assembly, and having on the periphery thereof a magnetic assembly, said magnetic assembly having alternately eight north pole permanent magnets, and eight south pole permanent magnets generating a magnetic field having a predetermined magnetic flux density, said magnet assembly defining sixteen nonmagnetic gaps, each nonmagnetic gap of which is located within said rotor between one of the north pole permanent magnets, and one of the south pole permanent magnets of said magnetic assembly, said rotor and said toroidal winding assembly defining a gap therebetween;

a first hall effect sensor mounted upon said housing and having an output for sensing the flux density of the magnetic field generated by said magnetic assembly, and for providing a first analog signal proportional to the flux density of the magnetic field sensed thereby;

a second hall effect sensor having an output, mounted upon said housing, and positioned upon said housing such that when said first hall effect sensor is positioned adjacent one of said nonmagnetic gaps, said second hall effect sensor will be positioned at the center of the adjacent north or south pole permanent magnet of said magnetic assembly, said second hall effect sensor for sensing the flux density of the magnetic field generated by said magnetic assembly, and for providing a second analog signal proportional to the flux density of the magnetic field generated by said magnetic assembly;

a direct current voltage source having an output for producing a direct current voltage signal; and a multiplier circuit having a first input connected to the output of said first hall effect sensor, a second input connected to the output of said second hall effect sensor, a third input connected to the output of said direct current voltage source, a first output connected to the first terminal of said first coil, and a second output connected to the first terminal of said second coil for multiplying said first analog signal by said direct current voltage signal so as to provide a first winding excitation signal, and for multiplying said second analog signal by said direct current voltage signal so as to provide a second winding excitation signal, said first winding excitation signal to effect the excitation of the first and third coils of said toroidal winding assembly, and said second winding excitation signal to effect the excitation of the second and fourth coils of said toroidal winding assembly so as to cause the rotation of said rotor in a predetermined direction at a constant speed.

8. The electric motor of claim 7, wherein said multiplier circuit comprises:

a first signal multiplier having a first input connected to the output of said first hall effect sensor, and a second input connected to the output of said direct current voltage source; and a second signal multiplier having a first input connected to the output of said second hall effect sensor, and a second input connected to the output of said direct current voltage source.

9. The electric motor of claim 7, in which said rotor includes at the center thereof a shaft, one end of which passes through the first of the pair of apertures of said metallic housing, and the opposite end of which passes through the second of said pair of apertures of said metallic housing.

10. The electric motor of claim 7, further characterized by:

a first amplifier connected between the first output of said multiplying circuit and the first terminal of said first coil; and a second amplifier connected between the second output of said multiplying circuit and the first terminal of said second coil.

* * * * *